United States Patent [19]

Lederman

[11] 4,274,655
[45] Jun. 23, 1981

[54] RESILIENT MOUNT FOR MACPHERSON STRUT

[75] Inventor: Frederick E. Lederman, Sandusky, Ohio

[73] Assignee: General Motors Corporation, Detroit, Mich.

[21] Appl. No.: 88,838

[22] Filed: Oct. 29, 1979

[51] Int. Cl.$^3$ ............................................. B60G 11/42
[52] U.S. Cl. ..................................... 280/688; 267/8 R
[58] Field of Search ............... 280/688, 690, 692, 696, 280/722, 724; 267/8, 20, 30, 8 R, 20 A

[56] References Cited

U.S. PATENT DOCUMENTS

| 3,957,128 | 5/1976 | Salver et al. | 280/692 X |
| 4,120,543 | 10/1978 | Greene, Jr. et al. | 308/233 |
| 4,175,770 | 11/1979 | Draisbach et al. | 280/696 X |
| 4,175,771 | 11/1979 | Muzechuk | 280/696 |
| 4,200,307 | 4/1980 | Szabo | 280/696 X |

FOREIGN PATENT DOCUMENTS 1341765  9/1963  France.

Primary Examiner—Randolph A. Reese
Assistant Examiner—Norman L. Stack, Jr.
Attorney, Agent, or Firm—F. J. Fodale

[57] ABSTRACT

A resilient mount attaches the upper end of a MacPherson strut to vehicle body support structure. The mount comprises an annular mounting plate, an elastomeric ring, a central sleeve with an attached end plate, and a ball thrust bearing. The annular mounting plate, the central sleeve and the upper bearing ring of the thrust bearing are bonded to the elastomeric ring to form a subassembly. The mounting plate has a central cup-shaped portion which is embedded in the elastomeric ring and trapped between an enlarged head of the central sleeve and the end plate attached to it. The elastomeric ring has integral flexible lips at its lower end which retain the bearing elements and lower race ring and seal the ends of the thrust bearing.

4 Claims, 5 Drawing Figures

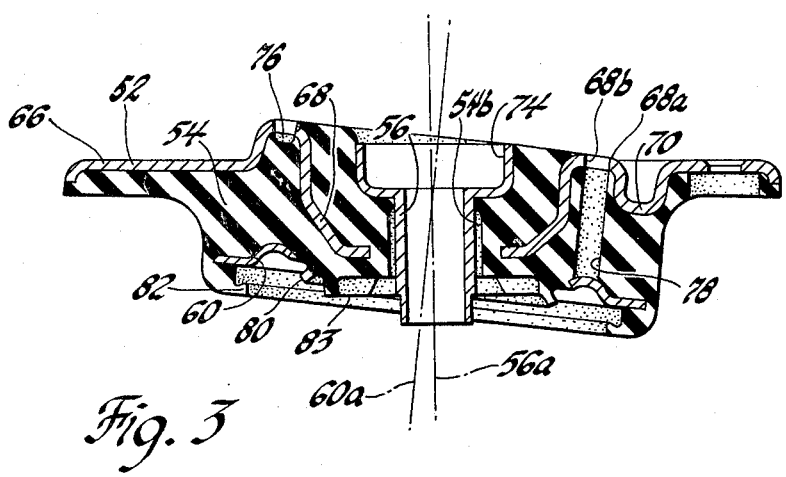
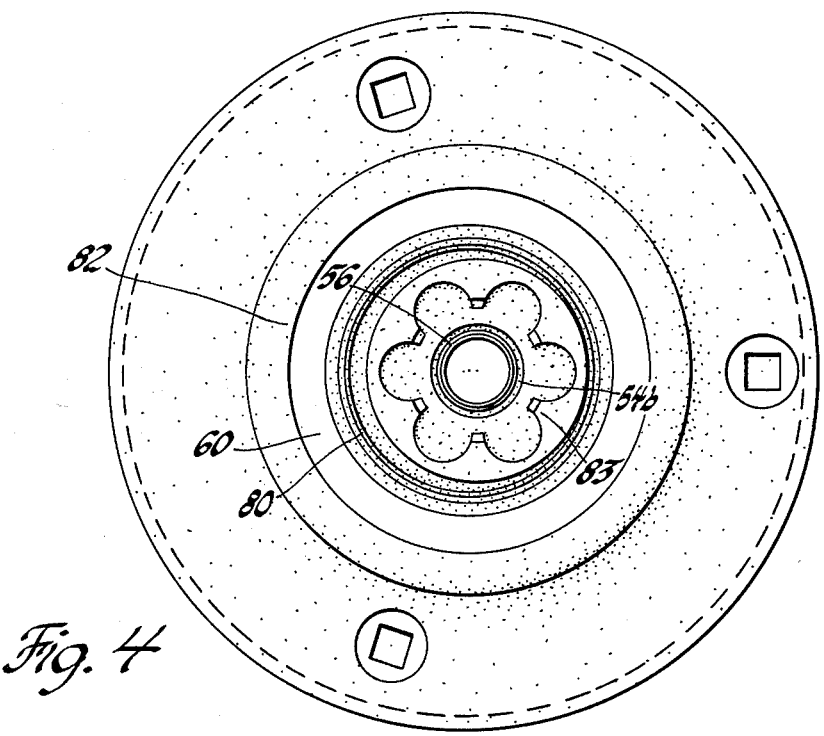
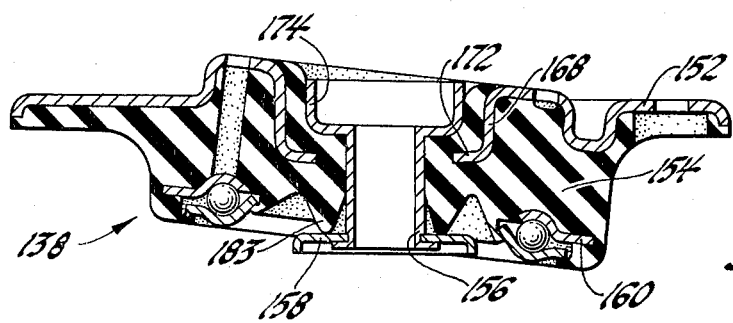

RESILIENT MOUNT FOR MACPHERSON STRUT

This invention relates generally to a resilient mount for the upper end of a MacPherson suspension strut and more particularly to a resilient mount of the type having an elastomeric ring which cushions the loads of the shock absorber as well as the loads of a coil spring which surrounds the shock absorber.

U.S. Patent Application Ser. No. 928,508 filed by Richard A. Muzechuk and Marvin J. Hyma July 27, 1978 and assigned to the assignee of this invention shows a resilient mount for the upper end of a MacPherson suspension strut which has an elastomeric ring which cushions the loads of both the shock absorber and the wheel suspension coil spring surrounding it during suspension jounce and rebound.

More specifically, the Muzechuk and Hyma patent application discloses a resilient mount 56 comprising an elastomeric ring 58, a flanged metal bushing 64, a ball thrust bearing 66, 70, 72 formed as a unit handled subassembly, and a pair of retainer members 74 and 76. The metal bushing 64 is bonded to the elastomeric ring 58 and attached to the end of the shock absorber piston rod 36. The ball thrust bearing abuts the lower end of the elastomeric ring 58 and is retained by trapping the outer edge of the upper race ring 66. The lower race ring 72 rotatably supports an upper spring support 44 for the coil spring 40. The elastomeric ring 54 is compressed axially and radially by partially enveloping, stamped metal retainers 74 and 76 which are secured together at their peripheries. The retainers 74 and 76 help retain the ball thrust bearing and secure the resilient mount 56 to the vehicle body structure 12. The preloaded outer portion of the elastomeric ring 54 is subjected to compression forces by the coil spring 40 during suspension jounce and rebound, while the preloaded center portion of the elastomeric ring 58 is subjected to shearing forces by the piston rod 36. The elastomeric ring 58 thus provides different predetermined stiffness characteristics for the coil spring 40 and the shock absorber 32.

Broadly the object of this invention is to improve upon the resilient mount disclosed in the aforesaid patent application by providing a simplified unit which reduces the number and complexity of the parts and saves weight.

Another object of the invention is to provide a resilient mount in which a mounting plate and upper race ring mold bonded to an elastomeric ring form a subassembly which improves bearing alignment and contact interface with the elastomeric ring and eliminates the need for a two piece retainer.

Yet another object of the invention is to provide a resilient mount having a subassembly as noted above in which the elastomeric ring has integral flexible retaining and sealing lips which reduces the complexity of the thrust bearing and the manner in which it is retained.

A feature of the invention is that the mounting plate is shaped to facilitate providing independent predetermined stiffness characteristics for the shock absorber and coil spring.

Another feature of the invention is that the mounting plate and the sleeve for attaching the piston rod are cooperatively shaped so that the elastomeric suppot for the piston rod is relatively stiff in the lateral direction.

Still another feature of the invention is that the sleeve which attaches the shock absorber piston rod to the elastomeric ring is designed to provide a fail-safe device in conjunction with the mounting plate.

These and other objects and advantages of the invention will be apparent when reference is made to the following description and accompanying drawing, wherein:

FIG. 3 is a cross sectional view of a subassembly of the resilient mount shown in FIGS. 1 and 2.

FIG. 4 is a bottom view of the subassembly shown in FIG. 3.

FIG. 5 is a cross section view showing a modified resilient mount embodying the invention.

Figure 1:
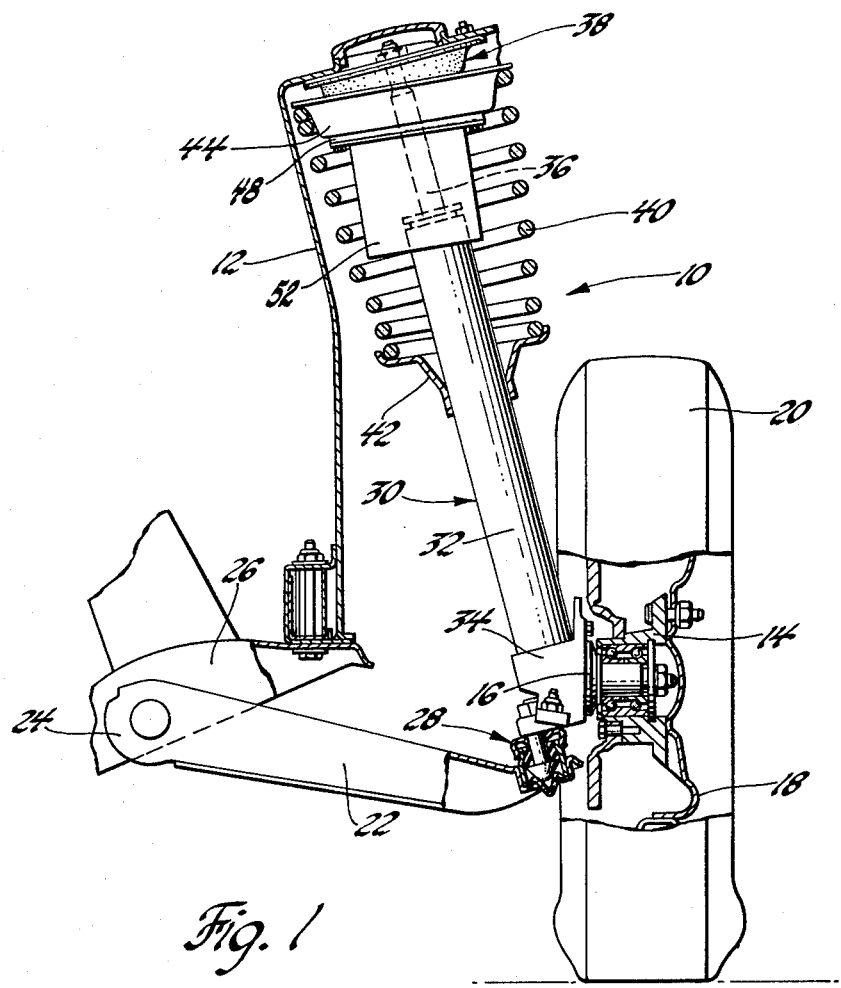
FIG. 1 is a partially sectioned front view of a vehicular front suspension system employing a MacPherson strut attached to the vehicle body by a resilient mount embodying the invention.

Referring now to the drawings in greater detail, FIG. 1 illustrates a front suspension system 10 mounted at its upper end on a tower-like structure 12 of the vehicle body usually associated with the wheel well. The suspension system supports a wheel hub 14 which is rotatably mounted on a spindle portion of a steering knuckle 16. A conventional wheel 18 and tire 20 are mounted on the hub 14.

The suspension system 10 includes a lower control arm 22, which may be of the wishbone type, having its inner ends 24 pivotally mounted to the vehicle frame or underbody 26 and is outer end connected by a ball joint 28 to the steering knuckle 16.

The suspension system 10 employs a MacPherson strut comprising a shock absorber 30 which has an outer casing 32 mounted at its lower end in a bracket 34, which may be formed on or secured to the steering knuckle 16. The shock absorber 30 has an internal piston (not shown) attached to a piston rod 36 which extends out of the upper end of the casing 32 and is flexibly connected to the vehicle body structure 12 by a resilient mount 38 which is the subject matter of this invention.

The axis of the shock absorber 30 does not coincide with the steering axis for the wheel 18 which is determined by the centers of the resilient mount 38 and the ball joint 28 and it may or may not intersect the axis of the wheel 18 depending on the particular application. For instance, the mounting bracket 34 may be located above, or in front of, or to the rear of the axis of the wheel 14 an amount sufficient to accommodate a drive axle in a front wheel drive vehicle.

The MacPherson strut further comprises a coil spring 40 surrounding the upper part of the casing 32 and the piston rod 36. The lower end of the coil spring 40 is mounted on a lower spring plate 42 secured to the outer casing 32 while the upper end reacts against an upper spring plate 44 which is supported by the resilient mount 38 in a manner to be described. The lower spring plate 42 may be either concentric or non-concentric with respect to the shock absorber casing 32, depending upon the particular model vehicle involved.

Figure 2:
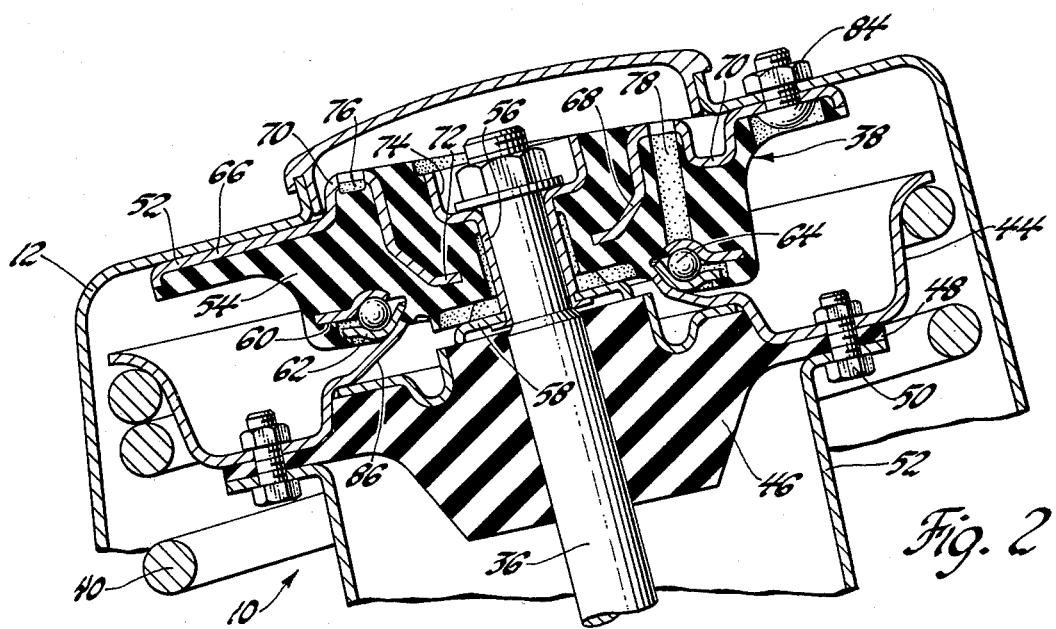
FIG. 2 is an enlarged cross sectional view of a portion of FIG. 1 showing the resilient mount and adjacent suspension structure in greater detail.

Referring now to FIG. 2, the upper spring plate 44 has a rubber bushing 46 which is secured beneath its central portion by integral tabs 48 and suitable fasteners 50 such as the nuts and bolts illustrated in FIG. 2. The piston rod 36 slides freely in the rubber bushing 46 so that the bushing 46 serves as a resilient stop or bumper for the end of the shock absorber casing 32. The fasteners 50 also secure a cylindrical dust shield 52 to the upper spring plate 44 for protecting the upper end of the casing 32 and the piston rod 36.

The resilient mount 38 comprises an annular stamped metal mounting plate 52, an elastomeric ring 54, a central metal sleeve 56 having an attached end plate 58, and a ball thrust bearing which includes an upper race ring 60, a lower race ring 62 and a full complement of bearing balls 64.

The mounting plate 52 has a flat outer flange 66 which is used to secure the resilient mount 38 to the vehicle body structure 12 and a cup-shaped central portion 68. The cup-shaped portion 68 is connected to the flat outer flange 66 by an asymmetrical transition 70 which changes from a depressed U-shaped section to a projecting L-shaped section and back again in the circumferential direction. The transition 70 accommodates the orientation of the flat outer flange 66, the sleeve axis 56a and the bearing axis 60a required for a particular vehicle and may not be necessary for other vehicle designs.

The cut-shaped portion 68 is embedded in the elastomeric ring 54 and has a pierced bottom wall which provides a radial lip 72 which surrounds the sleeve 56 in a spaced concentric relationship. The radial lip 72 is disposed between a cup-shaped head 74 of the sleeve 56 and an end plate 58 attached to the lower end of the sleeve. The radial lip 72 projects radially inwardly of the head 74 and end plate 58 to provide a fail-safe device for retaining the piston rod 36 in the event the inner portion of the elastomeric ring 54 shears.

The mounting plate 52, elastomeric ring 54, central sleeve 56 and upper race ring 60 are formed as a subassembly in which the elastomeric ring 54 is bonded to the mounting plate 52, the central sleeve 56 and the upper race ring 60 as shown in FIG. 3. This subassembly may be formed by molding and vulcanizing the elastomeric ring 54 in a suitable mold which properly positions the mounting plate 52, central sleeve 56 and upper race ring 60 in the mold cavity.

The cup-shaped portion 68 has an exposed upper flange 68a which has a plurality of apertures 68b which receive mold pins to produce voids 76 and 78 in the outer portion of the elastomeric ring 54. The number and depth of these voids are selected to provide a predetermined independent resilience or spring rate for the outer portion of the elastomeric ring 56 which supports the coil spring 40 via the bearing 60, 62, 64 and the upper spring plate 44. These voids can also be patterned circumferentially to provide lateral support for the coil spring 40 which has one stiffness in the longitudinal direction of the vehicle and another stiffness in the side direction.

The elastomeric ring 54 is molded around the outer edge of the upper race ring 60 and has integral flexible inner and outer circumferential lips 80 and 82 at the lower end of the elastomeric ring 54 concentric with the mold bonded upper race ring 60.

The central portion of the elastomeric ring 54 has a shallow cavity at its lower end which provides a scalloped ledge 83 inside the inner flexible lip 80 for lightly supporting the end plate 58 after it is assembled as shown in FIG. 2. During suspension jounce and rebound the forces of the piston rod 36 are essentially resisted entirely by the portion of the elastomeric ring 56 inside the cup-shaped portion 68 even when the piston rod 36 moves upwardly with respect to the resilient mount 38. Consequently the resilience or spring rate for the portion of the elastomeric ring 54 which supports the shock absorber 30 is independently predetermined by the sizes, shapes and relative proximity of the upper end of the sleeve 56 (including its cup-shaped head 74) and the cup-shaped portion 68 of the mounting plate 52. These parameters are selected to produce the stiffness desired.

The portion of the elastomeric ring 56 inside the cup-shaped portion 68 also provides a relatively stiff lateral support for the piston rod 36. The cardanic flexibility of the sleeve 56 and the piston rod 36 can be increased while still retaining a relatively stiff lateral support by providing an annular void 54b around the lower portion of the sleeve 56 during the molding process.

The resilient mount 38 is produced from the subassembly by adding the end plate 58, the bearing balls 64 and the lower race ring 62. The end plate 58 is mounted on the reduced lower end portion of the central sleeve 56 which is then spun over to secure the end plate 58 as shown in FIG. 2. The primary function of the end plate 58 is a fail-safe device and it does not appreciably affect the resilient support of the piston rod 36 as noted above.

The ball thrust bearing is completed by inverting the subassembly from its upright postion shown in FIG. 3 and supporting the complement of bearing balls 64 on the upper race ring 60. The lower race ring 62 is then placed on the bearing balls 64 with its inner and outer edges partially inserted beneath the lips 80 and 82. The lower race ring 62 is then rotated into place, similar to a wheel being mounted on a tire, to dispose the entire inner and outer edges inside the lips 80 and 82. The lips 80 and 82 then retain the lower race ring 62 and seal the inner and outer ends of the thrust bearing, respectively The resilient mount 38 supports the upper end of the MacPherson strut on the vehicle body structure 12 as illustrated in FIGS. 1 and 2. More particularly, the flat outer flange 66 of the mounting plate 52 is secured to the vehicle body structure 12 by suitable fasteners 84, such as the nuts and bolts shown in FIG. 2. The piston rod 36 of the shock absorber 30 is attached to the resilient mount 38 by a reduced upper end which is held in the central sleeve 56 by a bolt threaded onto the end of the piston rod. The upper spring plate 44 has an inner conic lip 86 which is biased against a similarly shaped portion of the lower race ring 62 by the coil spring 40.

The resilient mount 38 provides the following advantages. The mold bonding of the mounting plate 52 and the upper race ring 60 to the elastomeric ring 54 permits the replacement of the two retainers of the prior art with a single mounting plate which eliminates a part and saves weight while at the same time improves the alignment and contact interface of the bearing 60, 62, 64 with the elastomeric ring 54. The integral flexible retaining and sealing lips 80 and 82 of the elastomeric ring 54 reduces the complexity of the ball thrust bearing of the prior art which required a second molding operation to provide seal lips on the lower race ring and preassembly of the bearing. The inner cup-shaped portion 68 of the mounting plate 52 which is embedded in the elastomeric ring 54 more clearly defines the respective spring portions supporting the coil spring and the piston rods. These portions are easily independently designed to provide the desired stiffness characteristic for the coil spring 40 and the shock absorber 30 by the use of voids in the elastomeric ring 54 on the one hand and the shape, size and relative proximity of the central cup portion 68 and sleeve 56 on the other hand.

In the above embodiment of the invention, the motions of the piston rod 36 during suspension jounce and rebound are opposed primarily by the shear resistance of the central portion of the elastomeric ring 54 because the central sleeve 56 is bonded to the elastomeric ring 54. FIG. 5 discloses an alternate embodiment wherein the motions are opposed primarily by the compressive resistance of the central portion.

The resilient mount 138 is substantially the same as the resilient mount 38 except for the following modification. The central sleeve 156 of the resilient mount 138 is not bonded to the elastomeric ring 154 and is attached after the annular mounting plate 152 and upper bearing ring 160 have been mold bonded to the elastomeric ring 154 to form a subassembly. The cup-shaped portion 168 of the mounting plate 152 which is embedded in the elastomeric ring 154 is closer in shape and proximity to the enlarged cup-shaped head 174 of the sleeve 156. The central portion of the elastomeric ring 154 below the radial lip 172 more actively resists movement of the piston rod by virture of the annular bumper 183 of triangular cross section which engages the end plate 158 attached to the end of the central sleeve 156. The end plate 158 is also preferably attached to the central sleeve 156 so that the central portion of the elastomeric ring 154 is compressively preloaded to a sufficient degree so that the central portion is always subjected to compressive forces by the piston rod movements. Downward movement of the piston rod is resisted primarily by the compression resistance of the elastomeric ring portion inside of the cup-shaped portion 168. Consequently stiffness in the downward direction is predetermined by the relative sizes, shapes and proximities of the enlarged head 174, the upper end of the sleeve 156 and the cup-shaped portion 168 as before. Upward movement of the piston rod on the other hand is resisted primarily by the compression resistance of the portion between the radial lip 172 in general and the annular bumper 183 in particular which is shaped to provide a predetermined stiffness. The modified design has all of the advantages of the first embodiment with the additional advantage that different stiffness characteristics can be provided for the upward and downward movements of the piston rod.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A resilient mount for the upper end of a vehicle suspension strut comprising a shock absorber having an outer casing and a piston rod extending out of its upper end, and a coil spring surrounding the shock absorber and supported at its lower end by a spring plate attached to the outer casing, comprising:

an annular mounting plate for securing the resilient mount to vehicle support structure bonded to an upper surface of an elastomeric ring for cushioning the loads of the coil spring as well as the loads of the shock absorber during suspension jounce and rebound, an upper race ring bonded to a lower surface of the elastomeric ring and spaced from a cup-shaped central portion of the annular mounting plate embedded in the elastomeric ring, thrust bearing means for rotatably supporting the upper end of the coil spring comprising the upper race ring bonded to the elastomeric ring, and a complement of bearing elements and a lower race ring retained in assembly with the elastomeric ring by integral flexible lips at the lower end of the elastomeric ring which engage the lower race ring to seal the inner and outer ends of the thrust bearing means, and a central sleeve secured to the elastomeric ring for attaching the end of the piston rod of the shock absorber having an enlarged head disposed inside of the cup-shaped central portion of the annular mounting plate with a portion of the elastomeric ring disposed therebetween.

2. A resilient mount for the upper end of a vehicle suspension strut comprising a shock absorber having an outer casing and a piston rod extending out of its upper end, and a coil spring surrounding the shock absorber and supported at its lower end by a spring plate attached to the outer casing, comprising:

an annular mounting plate for securing the resilient mount to vehicle support structure bonded to an upper surface of an elastomeric ring for cushioning the loads of the coil spring as well as the loads of the shock absorber during the suspension jounce and rebound, an upper race ring bonded to a lower surface of the elastomeric ring and spaced from the annular mounting plate, said annular mounting plate having a cup-shaped central portion which is embedded in the elastomeric ring and has an outer diameter less than the inner diameter of the upper race ring, thrust bearing means for rotatably supporting the upper end of the coil spring comprising the upper race ring bonded to the elastomeric ring, and a complement of bearing elements and a lower race ring retained in assembly with the elastomeric ring by integral flexible lips at the lower end of the elastomeric ring which engage the lower race ring to seal the inner and outer ends of the thrust bearing means, and a central sleeve secured to the elastomeric ring for attaching the end of the piston rod of the shock absorber disposed inside of the cup-shaped central portion of the annular mounting plate with a portion of the elastomeric ring disposed therebetween, and an end plate which is attached to the central sleeve and abuts a lower surface of the elastomeric ring radially inward of the flexible lips, the cup-shaped central portion having a radial lip which is embedded in the elastomeric ring between the enlarged head of the central sleeve and the end plate attached to it and defines a hole smaller than the head and the end plate.

3. The resilient mount as defined in claim 2 wherein the central sleeve is mold bonded to the elastomeric ring so that axial movement of the central sleeve relative to the annular mounting plate is opposed primarily by the shear resistance of the elastomeric ring portion inside of the cup-shaped portion of the mounting plate.

4. The resilient mount as defined in claim 2 wherein the central portion of the elastomeric ring is compressively preloaded by the central sleeve and end plate and the axial movement of the central sleeve relative to the mounting plate is opposed primarily by the compressive resistance of the central portion of the elastomeric ring.

* * * * *